(12) United States Patent
Kawai et al.

(10) Patent No.: US 8,192,868 B2
(45) Date of Patent: Jun. 5, 2012

(54) LITHIUM ION BATTERY BEFORE PRE-DOPING AND LITHIUM ION BATTERY MANUFACTURING METHOD

(75) Inventors: Hideyasu Kawai, Toyota (JP); Keiichi Kohama, Susono (JP); Akira Tsujiko, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 415 days.

(21) Appl. No.: 12/525,565

(22) PCT Filed: Feb. 1, 2008

(86) PCT No.: PCT/JP2008/052084
§ 371 (c)(1),
(2), (4) Date: Aug. 3, 2009

(87) PCT Pub. No.: WO2008/096834
PCT Pub. Date: Aug. 14, 2008

(65) Prior Publication Data
US 2010/0086843 A1    Apr. 8, 2010

(30) Foreign Application Priority Data
Feb. 7, 2007   (JP) .................................. 2007-027819

(51) Int. Cl.
H01M 10/40 (2006.01)
H01M 10/38 (2006.01)
(52) U.S. Cl. .................... 429/231.4; 429/52; 429/231.8; 429/231.95

(58) Field of Classification Search .................. 429/231.4
See application file for complete search history.

(56) References Cited

U.S. PATENT DOCUMENTS

| 7,846,219 | B2* | 12/2010 | Shiozaki et al. | ............. 29/623.1 |
| 2004/0023118 | A1* | 2/2004 | Kinoshita et al. | ............. 429/232 |
| 2006/0110660 | A1* | 5/2006 | Satou et al. | ............. 429/231.95 |

FOREIGN PATENT DOCUMENTS

| JP | 8-102333 | 4/1996 |
| JP | 10-270090 | 10/1998 |
| JP | 11-283670 | 10/1999 |
| JP | 2000-235869 | 8/2000 |
| JP | 2000-306608 | 11/2000 |
| JP | 3238627 | 10/2001 |
| JP | 2004-303597 | 10/2004 |

* cited by examiner

*Primary Examiner* — John S Maples
(74) *Attorney, Agent, or Firm* — Finnegan, Henderson, Farabow, Garrett & Dunner, LLP

(57) ABSTRACT

A lithium ion battery before pre-doping includes: a negative electrode member before initial charge having a negative active material before initial charge; a positive electrode member; an electrolyte body; a battery case; and a lithium ion supply body formed by a lithium compound capable of emitting lithium ions when positive voltage is applied to it. The lithium ion supply body is arranged so that it is at least partially in contact with the inner exposed surface of the battery case. The negative electrode member before pre-doping is electrically insulated from the metal case member. The lithium ion supply body and the negative active material before initial charge are respectively in contact with the electrolyte body.

4 Claims, 10 Drawing Sheets

LITHIUM ION BATTERY BEFORE PRE-DOPING AND LITHIUM ION BATTERY MANUFACTURING METHOD

CROSS-REFERENCE TO RELATED APPLICATIONS

This is a national phase application filed under 35 U.S.C. 371 of PCT/JP2008/052084 filed on Feb. 1, 2008, which claims the benefit of priority from the prior Japanese Patent Application No. 2007-027819 filed on Feb. 7, 2007, the entire contents of all of which are incorporated herein by reference.

TECHNICAL FIELD

The present invention relates to a lithium ion battery before pre-doping, in which a negative active material before initial charge has not been previously doped with lithium, and to a lithium ion battery manufacturing method using the lithium ion battery before pre-doping.

BACKGROUND ART

In general, a lithium ion battery obtains electric energy by giving and receiving lithium ions between a positive active material and a negative active material. These lithium ions move from the positive active material to the negative active material through an electrolyte solution during charging and inversely move from the negative active material to the positive active material through the electrolyte solution during discharging. The lithium ions having moved to the negative active material receive electrons via a negative electrode member, so that lithium is doped into the negative active material.

In the case where a lithium ion battery is manufactured by using a negative active material that has not previously been doped with lithium, lithium does not initially exist in the negative active material and thus the battery cannot sufficiently discharge and act as a battery. Therefore, the battery has to be subjected to initial charge to dope lithium into the negative active material. This initial charge is performed by applying a predetermined voltage between a positive active material and a negative active material. At that time, however, a sold electrolyte interface (SEI) tending to disturb giving and receiving of lithium ions may be formed on an electrode surface and part of the lithium ions may be doped accidentally in a region of the negative active material that cannot contribute to charge and discharge reactions. SEI represents a film or layer that is generated by side reaction of battery reaction and a formation state thereof differs according to a material of the negative active material and a composition of the electrolyte solution. Those phenomena are irreversible reactions. Accordingly, during discharge following the initial charge, a discharge capacity tends to become smaller than an initial charge capacity. To reduce a capacity difference (irreversible capacity) caused by the irreversible capacity between the charge capacity during the initial charge and the discharge capacity during subsequent discharge, the battery has only to ensure an excessive amount of lithium or lithium ions by assuming that partial lithium or lithium ions of the lithium doped into the negative active material cannot be released during discharge.

A conceivable technique thereof is to make a positive electrode member carry or support an excessive amount of positive active material. However, this results in an increase in absolute mass of the positive active material provided in the positive electrode member and an increase in thickness of a positive active material layer from which lithium is released. This may lead to a problem that resistance in the positive electrode member increases (internal resistance of a battery increases).

Patent Literature 1 proposes that metal lithium is placed inside a case body of a lithium ion battery so that the metal lithium is electrically connected to a negative active material through a conduction member. This metal lithium supplies an excessive amount of lithium ions to the negative active material, separately from lithium ions existing in the positive active material.

According this technique, when an electrolyte solution is poured into the battery case in which the metal lithium is placed, the metal lithium is dissolved in the electrolyte solution in the form of lithium ions by a potential difference from the negative active material, and then the lithium ions are doped into the negative active material. Thus, the capacity difference (irreversible capacity) between the initial charge capacity during initial charge performed subsequently and a subsequent discharge capacity will practically be eliminated. It is possible to appropriately distribute adjustment weight of the positive active material and the negative active material, thereby enhancing energy density (see Patent Literature 1).

Patent Literature 1: JP8 (1996)-102333A

SUMMARY OF INVENTION

Technical Problem

The metal lithium is however a material having sufficient reactivity and its handling is troublesome. Furthermore, the metal lithium is easily oxidized in air and decomposes water to generate oxides. Accordingly, as disclosed in Patent Literature 1, there is a risk that, when the metal lithium is placed in the battery case, part of the metal lithium becomes oxide, a dissolved amount of lithium ions relatively decreases, and an amount of lithium doped into the negative active material decreases. In addition, as an amount of oxides changes, the doping amount will also change.

The present invention has been made to solve the above problems and has a purpose to provide a lithium ion battery before pre-doping capable of reducing irreversible capacity which occurs during initial charge, without using metal lithium hard to handle.

The present invention has another purpose to provide a method of manufacturing a lithium ion battery with reduced irreversible capacity by using the lithium ion battery before pre-doping.

Solution to Problem

To achieve the above purpose, a lithium ion battery before pre-doping comprises: a negative electrode member before initial charge, supporting a negative active material before initial charge; a positive electrode member supporting a positive active material; a electrolyte body; and a battery case internally housing the negative electrode member before being subjected to initial charge, the positive electrode member, and the electrolyte body, wherein the lithium ion battery before pre-doping comprises a lithium ion supply body made of a lithium compound capable of releasing lithium ions when negative voltage is applied to the negative electrode member before initial charge and positive voltage is applied to the lithium ion supply body while the negative active material before initial charge and the lithium ion supply body are respectively in contact with the electrolyte body, the battery case includes a metal case member made of metal, the metal case member including an inner exposed surface exposed inside the battery case and an outer exposed surface exposed outside the battery case, the lithium ion supply body is placed in contact with at least part of the inner exposed surface of the metal case member, the negative electrode member before initial charge and the metal case member are electrically insulated from each other, and the lithium ion supply body and the negative active material before initial charge are respectively in contact with the electrolyte body.

According the lithium ion battery before pre-doping, negative voltage is applied to the negative electrode member before initial charge (i.e., not-yet-initial-charged negative electrode member) while the terminal or the like is put in contact with the outer exposed surface of the metal case member to apply positive voltage to the lithium ion supply body through the metal case member. This makes it possible to release the lithium ions from the lithium ion supply body to dope lithium into the negative active material before initial charge (i.e., not-yet-initial-charged negative active material). After this doping treatment, when the initial charge is carried out by using the positive electrode member and the negative electrode member before initial charge, the lithium ions (lithium) supplied from the positive active material of the positive electrode member to the negative active material can return to the positive active material again during subsequent discharge. In other words, a difference (an irreversible capacity) between a charge capacity during initial charge and a discharge capacity during subsequent discharge can be reduced.

Furthermore, the lithium ion battery before pre-doping, in which a lithium compound is used for the lithium ion supply body, has low reactivity and easy to handle as compared with metal lithium. Unlike the case of using metal lithium, it is possible to restrain reduction or variation, resulting from generation of oxides, in the amount of lithium that can be doped into the negative active material before initial charge.

Moreover, the metal case member having the inner exposed surface exposed inside the battery case and the outer exposed surface exposed outside the battery case is used and the lithium ion supply body is placed in contact with the inner exposed surface. Accordingly, it is possible to easily apply positive voltage to the lithium ion supply body through the metal case member without needing an additional electrode member other than the positive electrode member and the negative electrode member.

The negative active material before initial charge may be any electrically conductive material that can electrochemically freely give and receive lithium and for example it may include an electrically conductive carbon material in which lithium can be doped. As to the negative electrode member before initial charge, its material and shape may be appropriately selected in consideration of the supporting negative active material before initial charge, the electrolyte body, the battery shape, etc. and preferably selected to provide smaller volume resistivity. A concrete one is copper foil.

The electrolyte body may include an electrolyte solution or a solid electrolyte body. The electrolyte solution may include for example a nonaqueous electrolyte solution produced by dissolving electrolyte such as $LiCF_3SO_3$, $LiAsF_6$, $LiClO_4$, $LiBF_4$, and $LiPF_6$ in an organic solvent such as ethylene carbonate, ethyl methyl carbonate, dimethyl carbonate, and diethyl carbonate or a mixed organic solvent thereof. When the supply solution is used as the electrolyte body, it is preferably carried by a separator made of polymer fiber for example and placed in contact with the lithium ion supply body and the negative active material before initial charge. The electrolyte body may be any solid material that has electrical conductivity and allows lithium ions to move therein. For example, it may include stabilized zirconia, for example. When a solid electrolyte body is used as the electrolyte body, it is preferably arranged in direct contact with each of the lithium ion supply body and the negative active material before initial charge.

The positive active material may be any solid lithium compound that can electrochemically give and receive lithium ions freely. For example, it may include $LiCoO_2$, $LiNiO_2$, $LiMn_2O_4$, $LiFeO_2$, $Li_5FeO_4$, $Li_2MnO_3$, $LiFePO_4$, $LiV_2O_4$, and mixtures thereof. As to the positive electrode member, its material and shape may be appropriately selected in consideration of the supporting positive active material, the electrolyte body, the battery shape, etc. and preferably selected to provide smaller volume resistivity. An example is aluminum foil.

The metal case member of the battery case may include a box-shaped battery case body that makes up most of the battery case, has an open portion, and can house the positive electrode member, the negative electrode member before initial charge, and the electrolyte body. On the contrary, it may be arranged such that the metal case member occupies a small portion of the battery case, for example, only a bottom, one side surface, or the like.

The metal case member may be externally covered by an insulation member such as resin. In this case, however, the insulation member is preferably partially formed with a through hole to expose the outer exposed surface.

The lithium compound constituting the lithium ion supply body may be any lithium compound capable of releasing lithium ions when negative voltage is applied to the negative electrode member before initial charge and positive voltage is applied to the lithium ion supply body while the negative electrode member before initial charge and the lithium ion supply body are respectively placed in contact with the electrolyte body. For example, it may include $LiFeO_2$, $LiCoO_2$, $LiNiO_2$, $LiMn_2O_4$, $Li_5FeO_4$, $Li_2MnO_3$, $LiFePO_4$, $LiV_2O_4$, and $Li_{2.6}Co_{0.4}N$. A more preferable one is inexpensive $LiFePO_4$.

In the above lithium ion battery before pre-doping, preferably, the lithium compound is a low oxidation potential lithium compound having an oxidation potential whose maximum oxidation potential obtainable when a lithium ion content is changed is lower than a corrosion potential of the metal making the metal case member.

In the lithium ion battery before pre-doping, the lithium ion supply body is placed in contact with the inner exposed surface of the metal case member. Accordingly, between the lithium ion supply body and the metal case member, a first electrical conduction system formed by direct contact and a second electrical conduction system formed through the electrolyte body can exist.

Meanwhile, the metal making the metal case member has a corrosion potential and the lithium compound making the lithium ion supply body has an oxidation potential. Some lithium compounds have an oxidation potential that varies depending on an own content of lithium ions.

If a maximum value (a maximum oxidation potential) of the oxidation potential of the lithium compound is higher than the corrosion potential of the metal making the metal case member, the metal case member may corrode progressively by an electric circuit constituted of the first electrical conduction system and the second electrical conduction system.

In the lithium ion battery before pre-doping, on the other hand, the maximum oxidation potential of the lithium compound is set lower than the corrosion potential of the metal making the metal case member. This makes it possible to restrain corrosion of the metal case member due to the above battery circuit.

When a metal material making the metal case member is stainless steel for example, a corrosion potential of stainless steel is about 4.0 V vs. Li$^+$/Li and accordingly the low oxidation potential lithium compound may include for example Li$_2$MnO$_3$ (3.5 V vs. Li$^+$/Li), LiFePO$_4$ (3.5 V vs. Li$^+$/Li), LiV$_2$O$_4$ (3.0 V vs. Li$^+$/Li), and Li$_{2.6}$Co$_{0.4}$N (1.4 V vs. Li$^+$/Li).

When a metal material making the metal case member is aluminum, a corrosion potential of aluminum is 4.3 V vs. Li$^+$/Li and accordingly the low oxidation potential lithium compound may include for example Li$_5$FeO$_4$ (4.0 V vs. Li$^+$/Li), Li$_2$MnO$_3$, LiFePO$_4$, LiV$_2$O$_4$, and Li$_{2.6}$Co$_{0.4}$N. The numeral in parentheses following each lithium compound represents a maximum oxidation potential of each lithium compound.

As a measuring technique of the oxidation potential of the lithium compound, for example, a cyclic voltammetry evaluation using a three-electrode system cell which is one of evaluation techniques for battery electrode materials. Herein, the three electrodes are a counter electrode, a reference electrode, and a working electrode. The evaluation is performed by using metal lithium as the counter electrode and the reference electrode and supporting foil that supports a lithium compound to be evaluated, as the working electrode.

According to another aspect, the invention provides a lithium ion battery manufacturing method of manufacturing a lithium ion battery before pre-doping comprising: a negative electrode member before initial charge, supporting a negative active material before initial charge; a positive electrode member supporting a positive active material; an electrolyte body; a battery case internally housing the negative electrode member before initial charge, the positive electrode member, and the electrolyte body; and a lithium ion supply body made of a lithium compound capable of releasing lithium ions when negative voltage is applied to the negative electrode member before initial charge and positive voltage is applied to the lithium ion supply body while the negative active material before initial charge and the lithium ion supply body are respectively in contact with the electrolyte body, wherein the battery case has a metal case member made of metal, the metal case member including an inner exposed surface exposed inside the battery case and an outer exposed surface exposed outside the battery case, the lithium ion supply body is placed in contact with at least part of the inner exposed surface of the metal case member, the negative electrode member before initial charge and the metal case member are electrically insulated from each other, and the lithium ion supply body and the negative active material before initial charge are respectively in contact with the electrolyte body, and wherein the method comprises a lithium doping step of applying positive voltage to the outer exposed surface of the metal case member and negative voltage to the negative electrode member before initial charge to apply a predetermined voltage between the negative active material before initial charge and the lithium ion supply body and release lithium ions from the lithium compound to dope lithium into the negative active material before initial charge.

According to the lithium ion battery manufacturing method, in the lithium doping process, positive voltage is applied to the outer exposed surface of the metal case member and negative voltage is applied to the negative electrode member before initial charge in the lithium ion battery before pre-doping. Thus, the positive voltage is also applied to the lithium ion supply body contacting the metal case member. This causes the lithium compound making the lithium ion supply body release lithium ions which will move, through the electrolyte body, to the negative active material before initial charge. The lithium ions receive electrons and hence the lithium is doped into the negative active material before initial charge. Thus, the lithium ion battery can be produced in which, prior to initial charge, the lithium has been doped previously into the negative active material before being subjected to initial charge.

When this lithium ion battery is then subjected to initial charge by applying positive voltage to the positive electrode member and negative voltage to the negative electrode member, the lithium supplied from the positive active material to the negative active material can return to the positive active material again during subsequent discharge. In other words, it is possible to reduce the irreversible capacity defined as a difference between a charge capacity during initial charge and a discharge capacity during subsequent discharge.

In the above lithium ion battery manufacturing method, preferably, the lithium compound is a low oxidation potential lithium compound having an oxidation potential whose maximum oxidation potential obtainable when a lithium ion content is changed is lower than a corrosion potential of the metal making the metal case member, and the lithium doping step includes setting the predetermined voltage to be higher than the maximum oxidation potential of the low oxidation potential lithium compound and lower than the corrosion voltage of the metal.

According to the above lithium ion battery manufacturing method, a predetermined voltage to be applied in the lithium doping process is set higher than the maximum oxidation potential of the lithium compound. It is therefore possible to reliably release lithium ions from the lithium compound whatever value a lithium ion content becomes in the lithium compound. Since the predetermined voltage is set lower than the corrosion potential of the metal making the metal case member, the lithium doping step can be performed without causing dissolution and corrosion of the metal of the metal case member.

REFERENCE SIGNS LIST 1, 101 Lithium ion battery before pre-doping
2, 102 Lithium ion battery 10, 110 Battery case
11 Battery case body (Metal case member)
11a First inner surface (Inner exposed surface)
11b Second inner surface (Inner exposed surface)
11c, 11d Outer exposed surface
21 Positive electrode member
22 Positive active material
24 Negative electrode member before initial charge
25 Negative active material before initial charge
30 Electrolyte solution (Electrolyte body)
61 First lithium ion supply body
62 Second lithium ion supply body
70 Lithium
71 Lithium ion

DESCRIPTION OF EMBODIMENTS

Embodiments

Figure 1:
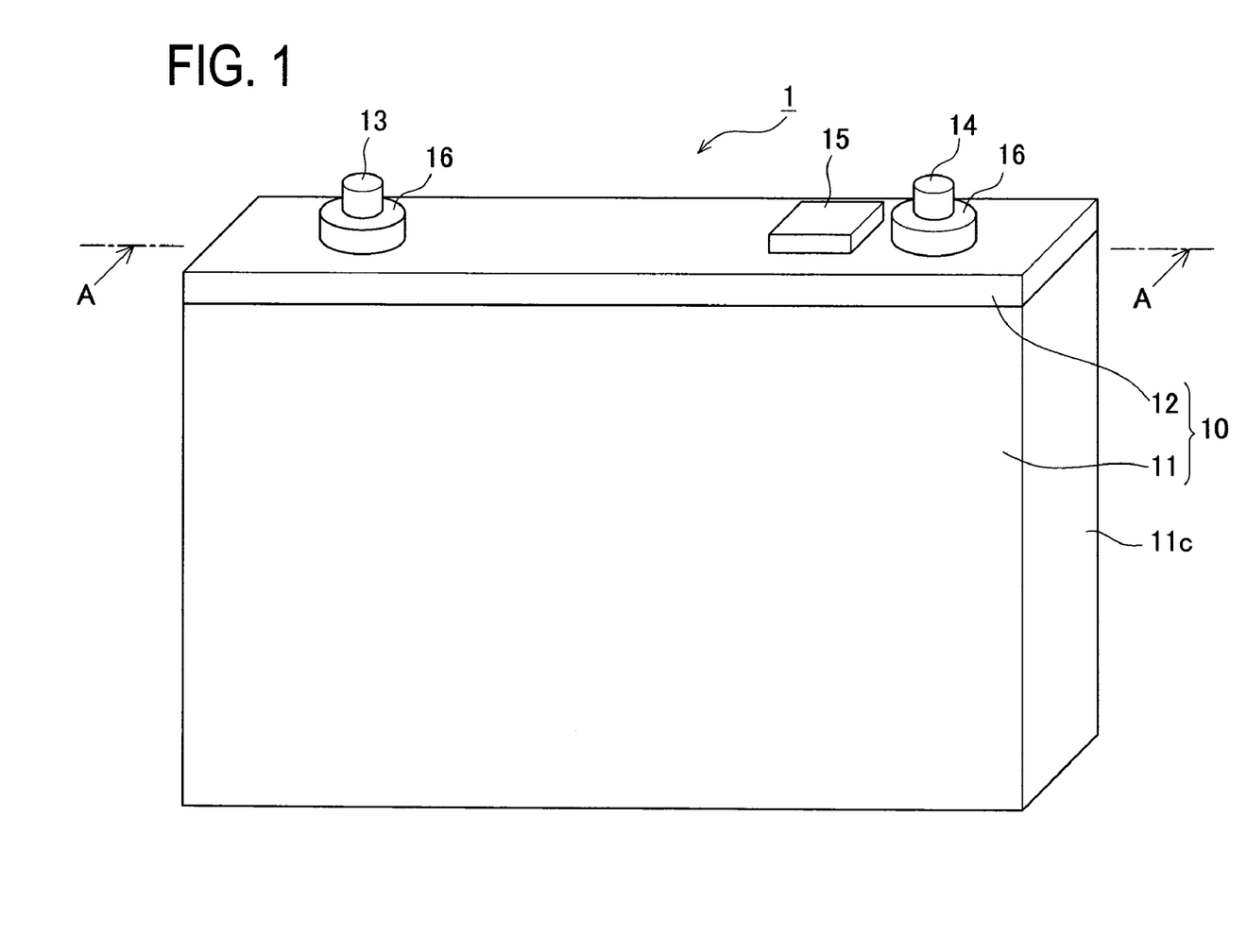
FIG. 1 is a perspective view of a lithium ion battery before pre-doping in a preferred embodiment.
Figure 2:
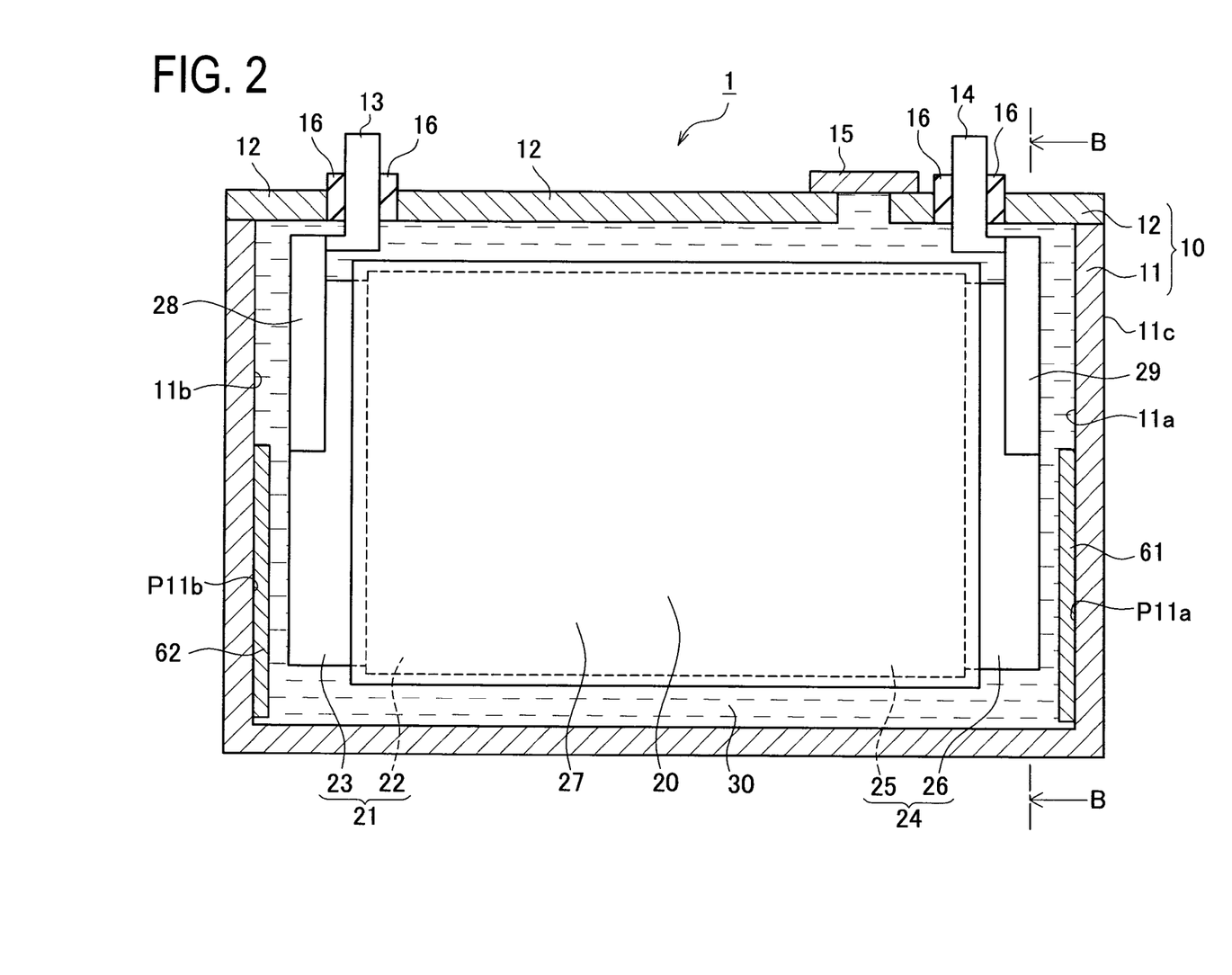
FIG. 2 is a sectional view (along a line A-A in FIG. 1) of the lithium ion battery before pre-doping in the embodiment.
Figure 3:
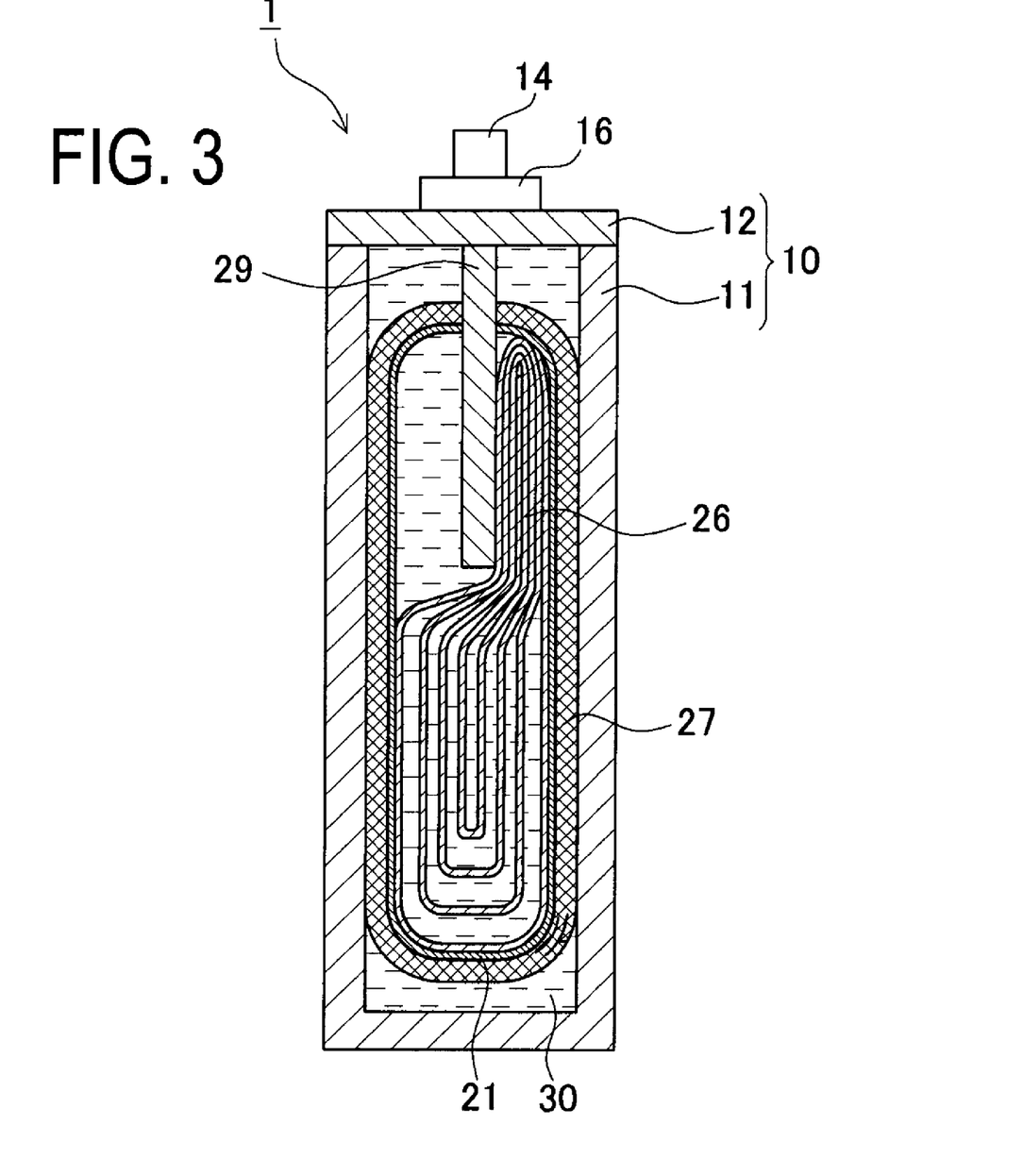
FIG. 3 is a sectional view (along a line B-B in FIG. 2) of the lithium ion battery before pre-doping in the embodiment.

A preferred embodiment of the invention will be described below with reference to accompanying drawings. A lithium ion battery before pre-doping (i.e., a not-yet-pre-doped lithium ion battery) 1 is first explained. FIG. 1 is a perspective view of the lithium ion battery before pre-doping 1, FIG. 2 is a sectional view (along a line A-A in FIG. 1) of the lithium ion battery before pre-doping 1, and FIG. 3 is a sectional view (along a line B-B in FIG. 2) of the lithium ion battery before pre-doping 1.

The lithium ion battery before pre-doping 1 in this embodiment is a wound-type lithium ion secondary battery before pre-doping (not yet pre-doped), including a battery case 10 having a battery case body 11 and closing cover 12, a power generating element 20, a first lithium ion supply body 61, a second lithium ion supply body 62, and an electrolyte solution 30.

The battery case body 11 is made of stainless steel, internally having a first inner surface 11a and a second inner surface 11b which are inner exposed surfaces and externally having an outer exposed surface 11c including four outer surfaces and a bottom surface.

The closing cover 12 is also made of stainless steel and is placed to close an opening of the battery case body 11. A positive terminal member 13 and a negative terminal member 14 are placed respectively protruding from an upper surface of the closing cover 12, and an insulation member 16 is interposed between the closing cover 12 and each of the terminal members 13 and 14. A safety valve 15 is also placed on the upper surface of the closing cover 12.

Furthermore, the power generating element 20 is made by winding a positive electrode member 21 and a negative electrode member before initial charge (i.e., a not-yet-initial-charged negative electrode member) 24 by interposing a polyethylene separator 27 therebetween (see FIG. 3). This positive electrode member 21 is formed by coating a positive active material 22 made of $LiMn_2O_4$ on surfaces of aluminum foil 23.

On the other hand, the negative electrode member before initial charge 24 is formed by coating a negative active material before initial charge (i.e., a not-yet-initial-charged negative active material) 25 made of a conductive carbon material on surfaces of copper foil 26. As shown in FIG. 3, portions of the copper foil 26 of the negative electrode member before initial charge 24 are laminated one on another on the outer side of the separator 27 and welded to a negative current collector 29 so that about a half of the portions wound in oblong shape is squeezed. Portions of the aluminum foil 23 of the positive electrode member 21 are similarly laminated one on another on the opposite outer side of the separator 27 from the negative current collector 29 and squeezed and welded to a positive current collector 28. However, excepting those welded portions, the adjacent portions of the copper coil 26 (and the aluminum foil 23) are spaced from each other. The negative active material before initial charge 25 positioned on a back side in FIG. 3 can easily contact with an electrolyte solution 30 through the separator 27.

The electrolyte solution 30 is an organic electrolyte solution produced by adding $LiPF_6$ as a solute to a mixed organic solvent prepared from EC (ethylene carbonate), EMC (ethyl methyl carbonate), and DMC (dimethyl carbonate).

Figure 4:
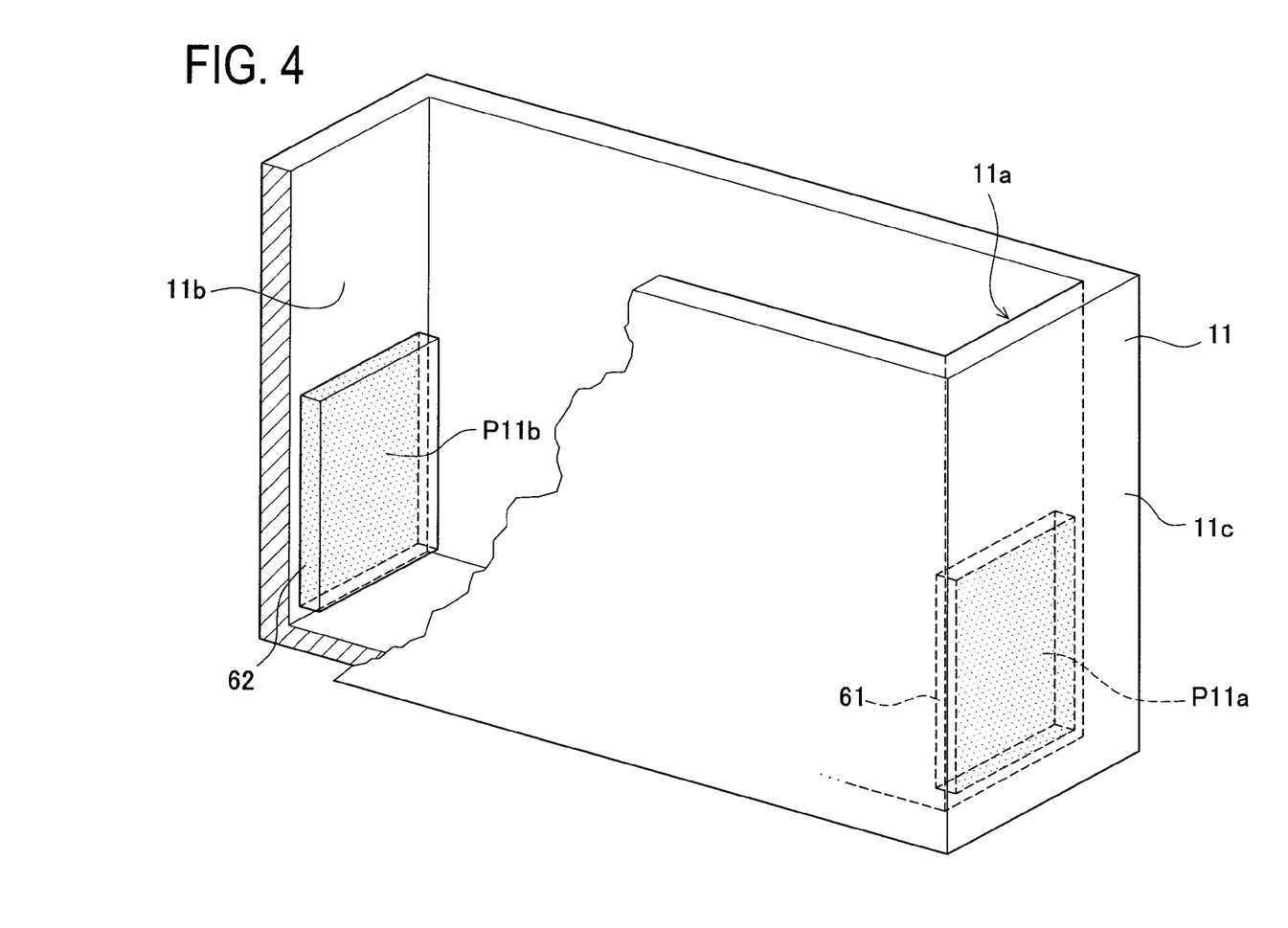
FIG. 4 is a perspective partial frame view of a battery case body in the embodiment.

In the lithium ion battery before pre-doping 1 in this embodiment, the first lithium ion supply body 61 and the second lithium ion supply body 62 are both made of $LiFePO_4$. The first lithium ion supply body 61 is supported on and in direct contact with a first supporting area P11a (a dotted surface in FIG. 4) in the first inner surface 11a of the battery case body 11 and the second lithium ion supply body 62 is supported on and in direct contact with a second supporting area P11b (a dotted surface in FIG. 4), respectively.

In the lithium ion battery before pre-doping 1 in this embodiment, negative voltage is applied to the negative electrode member before initial charge 24 through the negative terminal member 14 and the negative current collector 29. On the other hand, a terminal or the like is put in contact with the outer exposed surface 11c of the battery case body 11 and positive voltage is applied to the lithium ion supply bodies 61 and 62 through the first inner surface 11a and the second inner surface 11b of the battery case body 11. Thus, the lithium ion supply bodies 61 and 62 can release lithium ions 71 to dope lithium 70 into the negative active material before initial charge 25. Part of this lithium 70 will be inhibited from moving by an SEI formed on the negative active material before initial charge 25 or will be doped into a region that is not able to contribute to charge and discharge reactions. After this doping treatment, accordingly, when initial charge is performed by using the positive electrode member 21 (the positive active material 22) and the negative active material before initial charge 25 subjected to the doping treatment, the lithium ions 71 (lithium 70) supplied from the positive active material 22 of the positive electrode member 21 to the negative active material can return to the positive active material 22 again during subsequent discharge. In other words, it is possible to reduce a capacity difference (an irreversible capacity) between a charge capacity during initial charge and a discharge capacity during subsequent discharge.

The lithium ion supply bodies 61 and 62 are made of $LiFePO_4$. $LiFePO_4$ has lower reactivity as compared with metal lithium and easy to handle. Unlike the case of using metal lithium, is it possible to restrain reduction or variation, resulting from generation of oxides, in the amount of metal lithium that can be doped into the negative active material before initial charge 25.

Furthermore, in the battery case body 11 having the inner exposed surfaces 11a and 11b exposed inside the battery case 10 and the outer exposed surface 11c exposed outside the battery case 10, the lithium ion supply bodies 61 and 62 are placed in contact with the inner exposed surfaces 11a and 11b. Accordingly, it is possible to easily apply positive voltage to the lithium ion supply bodies 61 and 62 through the battery case body 11 without needing an additional electrode member other than the positive electrode member 21 and the negative electrode member 24 in the battery case 10.

Meanwhile, the battery case body 11 including the first supporting area P11a and the second supporting area P11b has a corrosion potential (4.0 V vs. $Li^+/Li$) of stainless steel.

On the other hand, LiFePO$_4$ making the first lithium ion supply body 61 and the second lithium ion supply body 62 has a property of increasing an oxidation potential as the amount of lithium ions contained therein decreases. The oxidation potential changes in a range of 3.4 to 3.5 V vs. Li$^+$/Li and hence it has a maximum oxidation potential (3.5 V vs. Li$^+$/Li).

In the lithium ion battery before pre-doping 1 in this embodiment, as mentioned above, the maximum oxidation potential of LiFePO$_4$ making the lithium ion supply bodies 61 and 62 is lower than the corrosion potential of stainless steel making the battery case body 11. The supporting areas P11a and P11b and the vicinity thereof in the battery case body 11 can be prevented from corroding.

Figure 5:
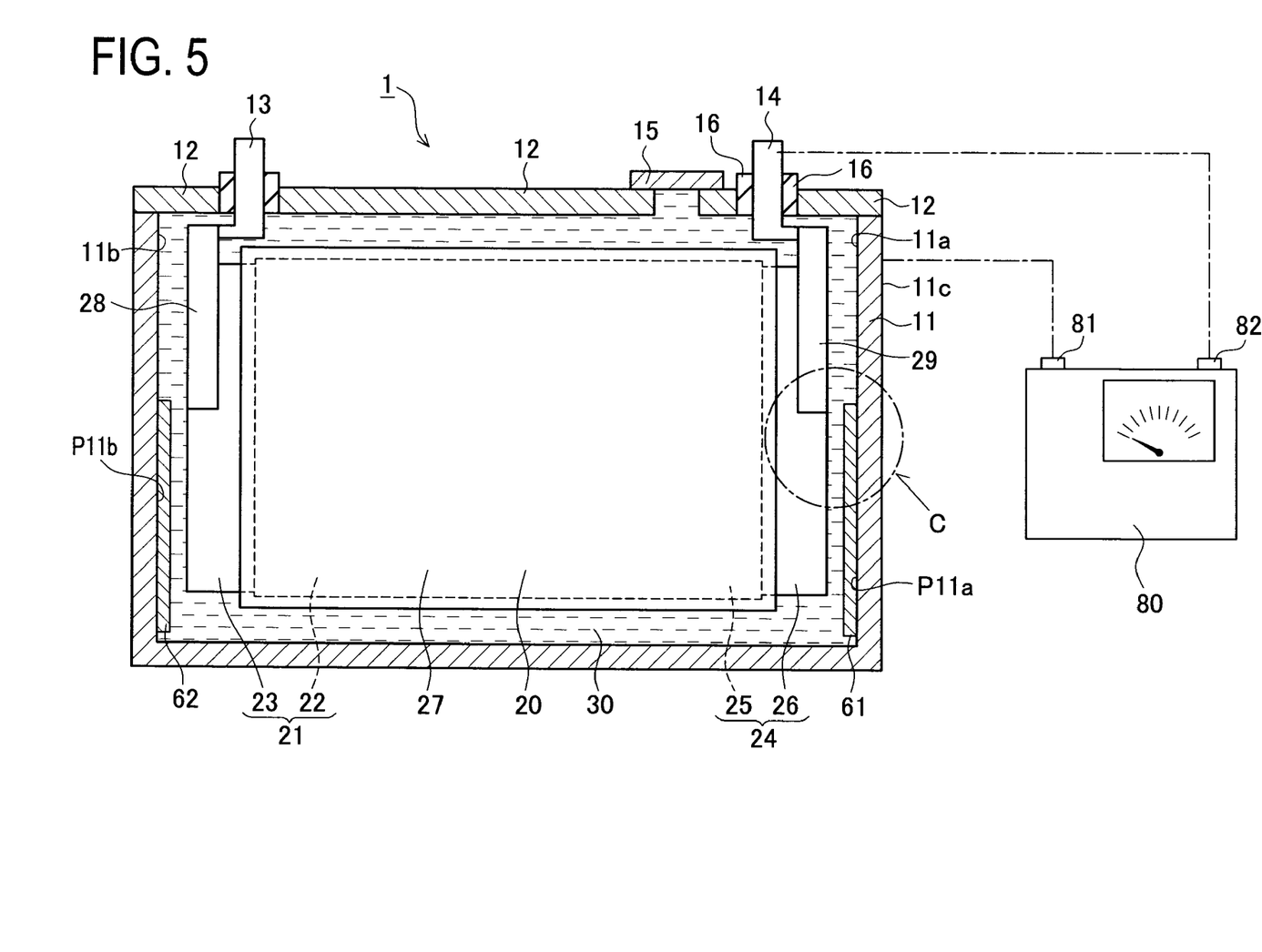
FIG. 5 is an explanatory view of a lithium doping process for the lithium ion battery before pre-doping in the embodiment.

A manufacturing method of a lithium ion battery 2 in this embodiment will be explained below with reference to FIGS. 5 to 7.

The lithium ion battery 2 in this embodiment is manufactured by subjecting the lithium ion battery before pre-doping 1 to the lithium doping process. FIG. 5 is an explanatory view showing a state in which the lithium ion battery before pre-doping 1 is electrically connected to a power unit 80.

The power unit 80 is able to continuously supply constant voltage. A positive terminal 81 of the power unit 80 is connected to the outer exposed surface 11c of the battery case body 11 and a negative terminal 82 of the power unit 80 is connected to the negative terminal member 14 of the lithium ion battery before pre-doping 1, respectively.

Figure 6A:
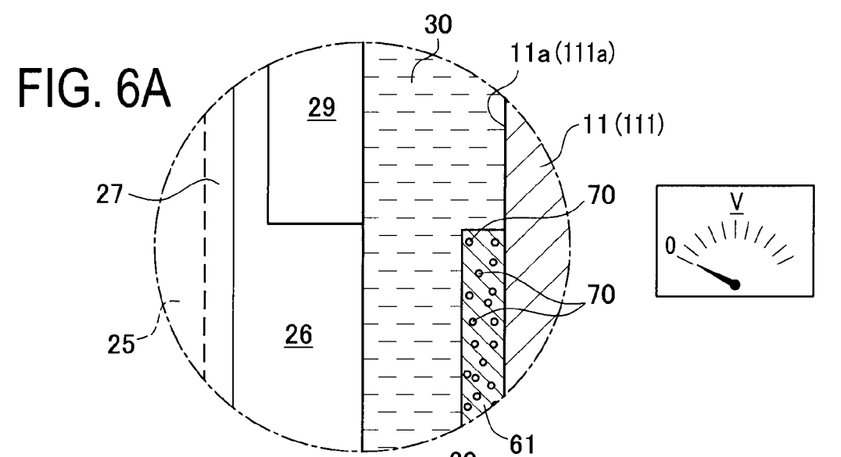
FIGS. 6A to 6C are explanatory views of the lithium doping process in the embodiment, FIG. 6A showing a state before voltage application, FIG. 6B showing a state of releasing lithium ions, and FIG. 6C showing a lithium doping state.
Figure 6B:
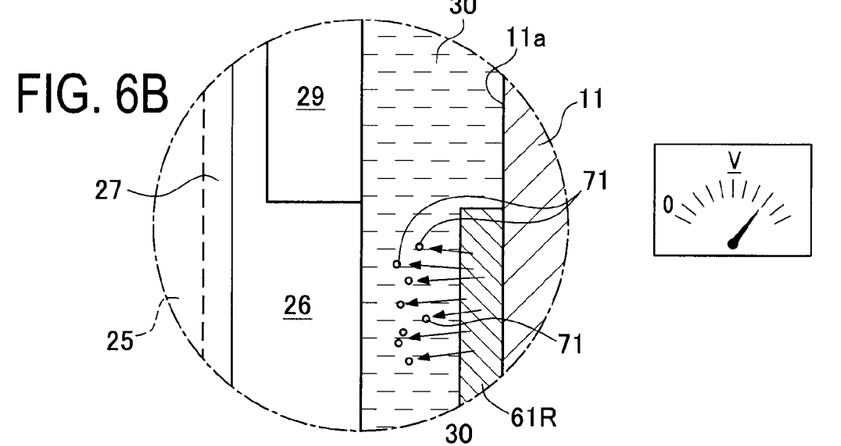
Figure 6C:
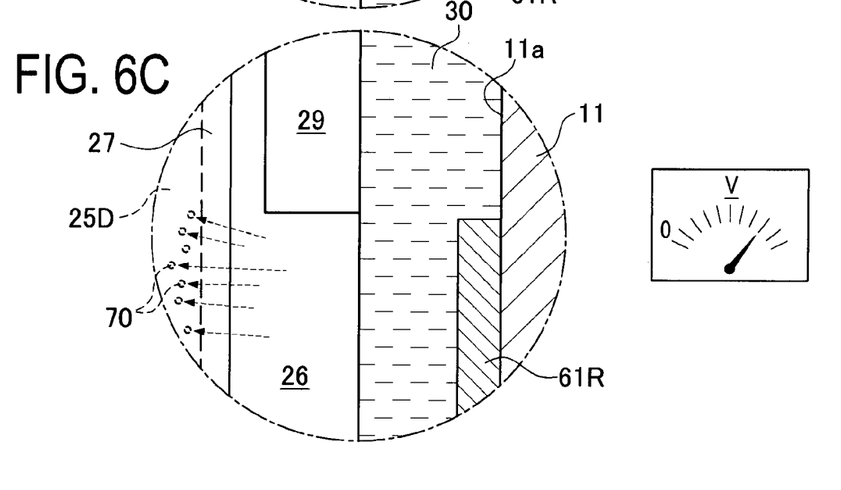

FIGS. 6A to 6c are explanatory views schematically show an internal state of the lithium ion battery before pre-doping 1 in the lithium doping process applied to the lithium ion battery before pre-doping 1.

FIG. 6A shows a state before a predetermined voltage (3.7 V in this embodiment) is supplied from the power unit 80 to the lithium ion battery before pre-doping 1. The first lithium ion supply body 61 internally having the lithium 70 contacts the electrolyte solution 30. The negative active material before initial charge 25 supported on the copper foil 26 also contacts the electrolyte solution 30 (see FIG. 3).

When the lithium ion battery before pre-doping 1 is supplied with the predetermined voltage from the power unit 80, successively, the lithium 70 in the first lithium ion supply body 61 loses electrons through the battery case body 11 applied with positive voltage and becomes the lithium ions 71, which are released from the first lithium ion supply body 61 into the electrolyte solution 30, as shown in FIG. 6B. Thus, the first lithium ion supply body 61 becomes a first lithium ion supply body 61R that has a lithium ion content decreased by just that much.

When the lithium ion battery before pre-doping 1 is continuously supplied with the predetermined voltage from the power unit 80, the negative active material before initial charge 25 gives electrons to the lithium ions 71 having moved into the negative active material 25 through the electrolyte solution 30 as shown in FIG. 6C. As a result, it becomes a negative active material 25D internally doped with lithium 70.

The above phenomenon that occurs in the lithium doping process is similarly induced in the second lithium ion supply body 62. Specifically, before application of voltage from the power unit 80, the second lithium ion supply body 62 internally contains lithium 70. Upon application of a predetermined voltage, the lithium 70 in the second lithium ion supply body 62 becomes the lithium ions 71, which are released from the second lithium ion supply body 62 into the electrolyte solution 30. Thus, the second lithium ion supply body 62 becomes a second lithium ion supply body 62R that has a decreased lithium ion content. The lithium ions 71 released from the second lithium ion supply body 62 similarly move to the negative active material before initial charge 25 and become lithium 70, which is doped into a negative active material 25D.

Figure 7:
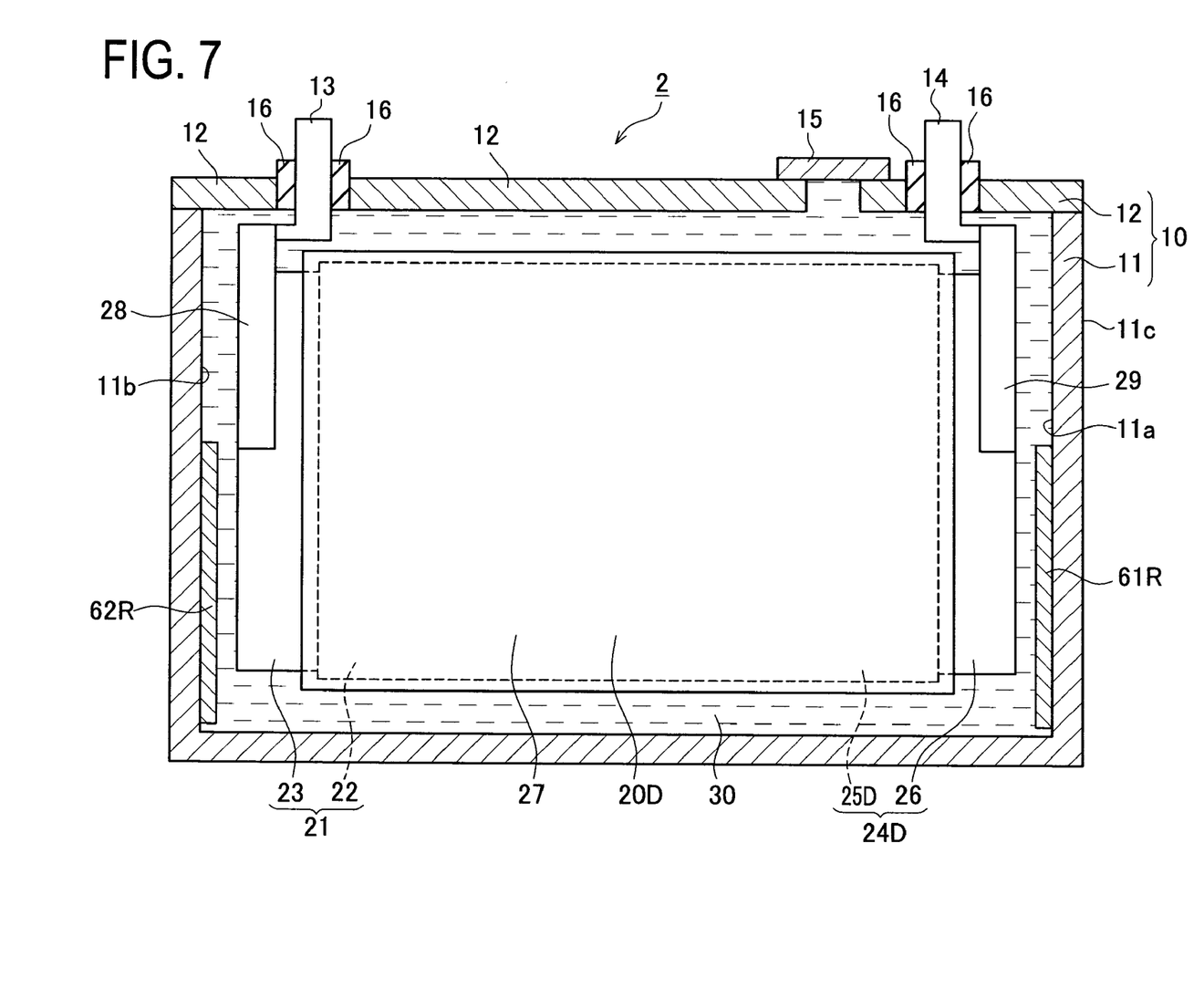
FIG. 7 is a sectional view of a lithium ion battery in the embodiment.

FIG. 7 is a sectional view of the lithium ion battery 2 obtained after the lithium doping process. A power generating element 20D has the negative active material 25D doped with the lithium 70.

After the lithium doping process, when initial charge of the lithium ion battery 2 is performed by applying positive voltage to the positive electrode member 21 through the positive terminal 13 and negative voltage to the negative active material 25D through the negative terminal member 14, the lithium ions 71 (lithium 70) supplied from the positive active material 22 of the positive electrode member 21 to the negative active material 25D can return to the positive active material 22 again during subsequent discharge. In other words, it is possible to reduce a capacity difference (an irreversible capacity) between a charge capacity during initial charge and a discharge capacity during subsequent discharge.

Of the battery case body 11, the first inner surface 11a directly contacts the first lithium ion supply body 61 in the first supporting area P11a. The corrosion potential of stainless steel making the battery case body 11 is 4.0 V vs. Li$^+$/Li. On the other hand, the maximum oxidation potential of LiFePO$_4$ making the first lithium ion supply body 61 is 3.5 V vs. Li$^+$/Li. It is to be noted that LiFePO$_4$ has a property of increasing an oxidation potential as a lithium ion content decreases.

In this embodiment, therefore, the predetermined voltage to be supplied from the power unit 80 between the first lithium ion supply body 61 and the second lithium ion supply body 62 is set at 3.7 V between the above corrosion potential and the maximum oxidation potential.

As above, the predetermined voltage to be applied in the lithium doping process is set higher than the maximum oxidation potential (3.5 V) of LiFePO$_4$. Accordingly, whatever value the lithium ion content of LiFePO$_4$ becomes in the first lithium ion supply body 61 and the second lithium ion supply body 62, these first lithium ion supply body 61 and second lithium ion supply body 62 (LiFePO$_4$) can reliably release the lithium ions 71. Since the predetermined voltage to be applied is set lower than the corrosion potential of stainless steel forming the battery case body 11, additionally, the lithium doping process can be performed without dissolving and corroding stainless steel of the battery case body 11 due to the application of the predetermined voltage.

(Modified Form)

Figure 8:
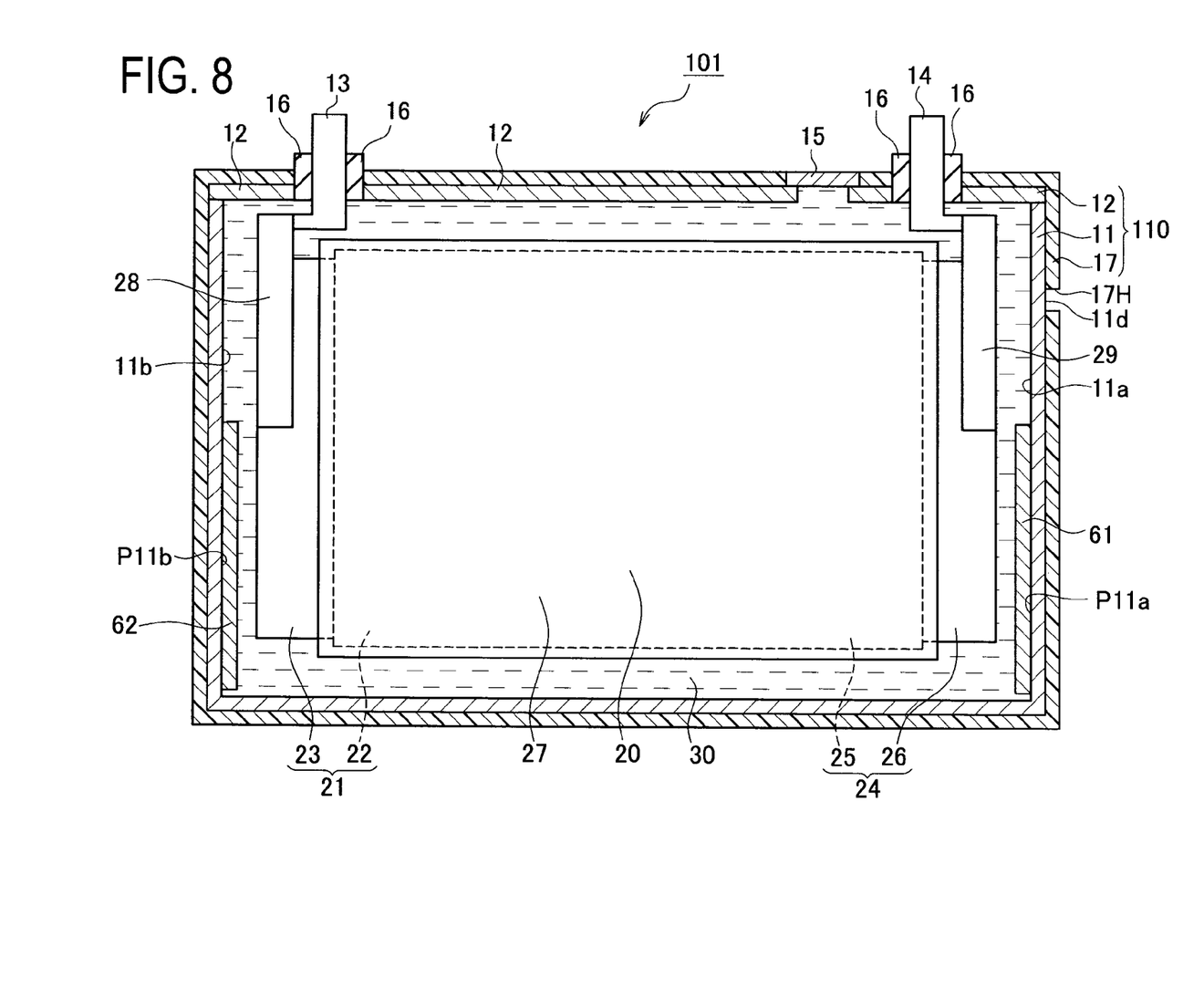
FIG. 8 is a sectional view of a lithium ion battery before pre-doping in a modified form.

A lithium ion battery before pre-doping 101 in a modified form will be explained below referring to accompanying drawings. FIG. 8 is a sectional view of the lithium ion battery before pre-doping 101.

The lithium ion battery before pre-doping 101 in this modified form is a wound-type lithium ion secondary battery before being (yet to be) subjected to pre-doping, including a battery case 110 having a battery case body 11 similar to the battery case body in the above embodiment, a closing cover 12 similar to that in the above embodiment, and a battery protecting member 17, and, as with the embodiment, a power generating element 20, a first lithium ion supply body 61, a second lithium ion supply body 62, and an electrolyte solution 30.

The battery case 110 of the lithium ion battery before pre-doping 101 in this modified form differs from that in the embodiment and includes the battery protecting member 17 covering an outer surface of the metal case member 11 and the closing cover 12 excepting the positive terminal member 13, the negative terminal member 14, and the safety valve 15.

The metal case member 11 internally has a first inner surface 11a and a second inner surface 11b as in the above embodiment and also has an outer exposed surface 11d that is exposed to the outside through a through hole 17H formed in the battery case protecting member 17.

This battery protecting member 17 is made of insulating polyamide resin.

It is to be noted that the power generating element 20, the first lithium ion supply body 61, the second lithium ion supply body 62, and the electrolyte solution 30 are the same as those in the embodiment.

In the lithium ion battery before pre-doping 101 in this modified form, as with the lithium ion battery before pre-doping 1 in the embodiment, the lithium 70 can be doped into the negative active material before initial charge 25 by applying positive voltage to the lithium ion supply bodies 61 and 62 and negative voltage to the negative active material before initial charge 25 through the outer exposed surface 11d. Since the metal case member 11 is externally covered by the battery case protecting member 17 made of insulating resin, furthermore, the battery case 110 can be protected and electric shock hazards can be reduced.

Figure 10:
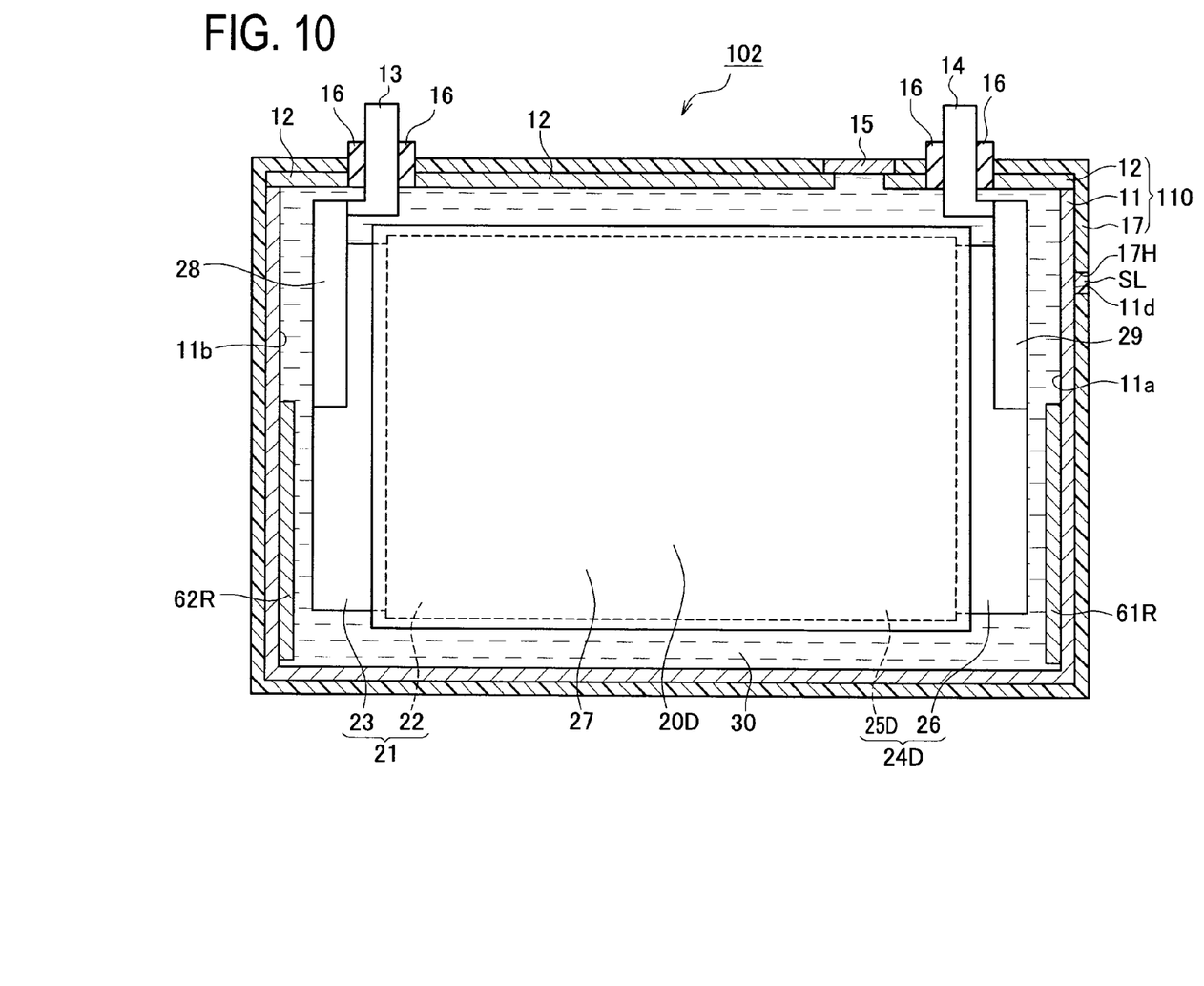
FIG. 10 is a sectional view of a lithium ion battery in the modified form.

The manufacturing method of a lithium ion battery 102 in this modified form includes the same lithium doping process as that for the lithium ion battery 2 in the embodiment.

Figure 9:
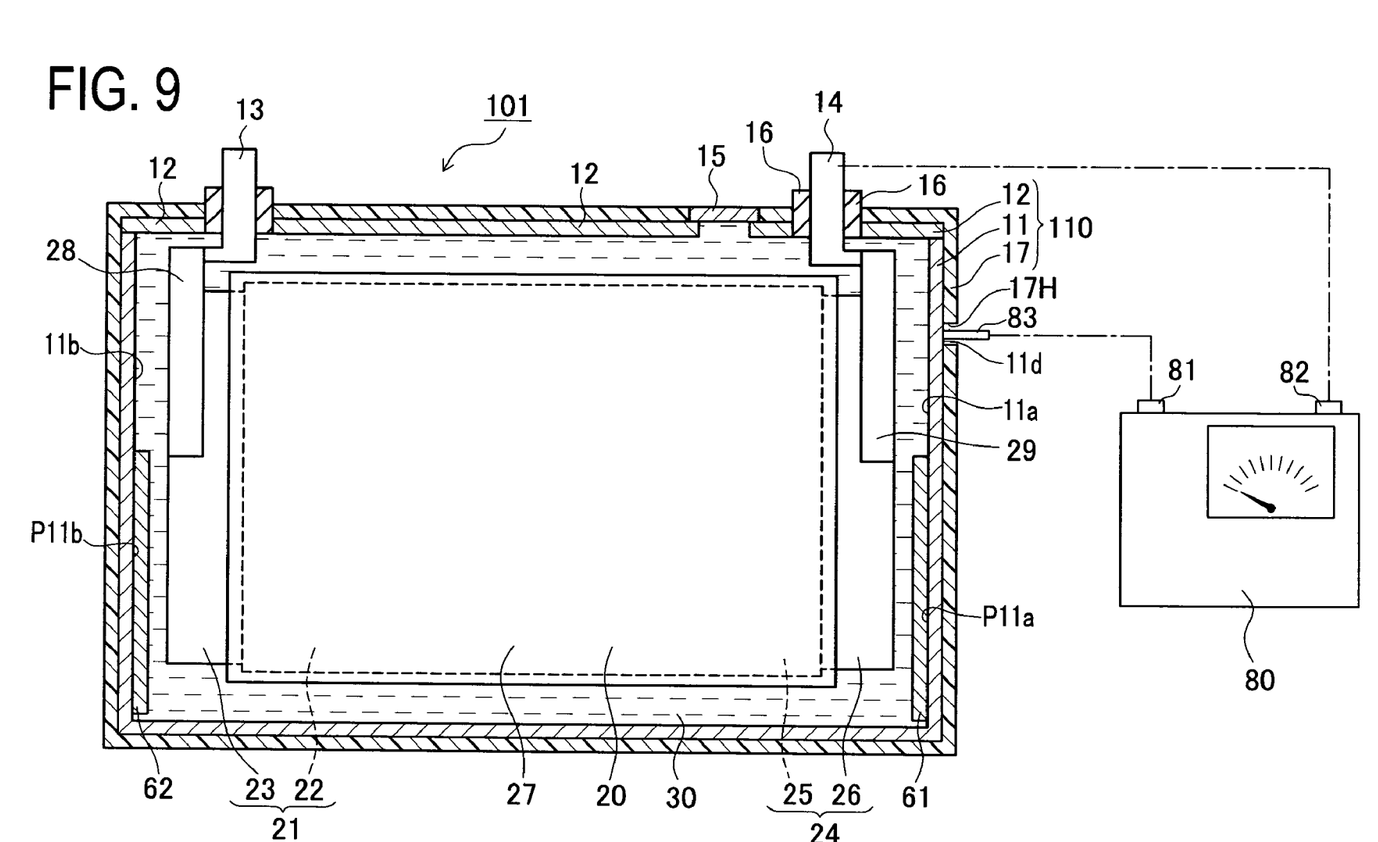
FIG. 9 is an explanatory view of a lithium doping process of the lithium ion battery before pre-doping in the modified form.

However, differently from the embodiment, a pin 83 electrically connected with the positive terminal 81 of the power unit 80 is placed in contact with the outer exposed surface 11d of the metal case member 11 through the through hole 17H of the battery case protecting member 17 as shown in FIG. 9.

After the lithium doping process, a filler SL made of insulating resin is preferably filled in the battery case protecting member 17 to cover the outer exposed surface 11d of the metal case member 11.

The lithium ion battery 102 manufactured as above can reduce an irreversible capacity during initial charge as with the lithium ion battery 2 in the embodiment.

The present invention is explained along the embodiment and the modified form but not limited thereto. It may be embodied in other specific forms without departing from the essential characteristics thereof.

For instance, in the embodiment and others, the lithium ion supply bodies are supported on the inner exposed surfaces of the metal case member in two places. The lithium ion supply body(s) is preferably placed in contact with at least part of the inner exposed surface of the metal case member. Accordingly, a single lithium ion supply body may be provided or many more lithium ion supply bodies may be provided.

The embodiment and the modified form exemplify the lithium ion secondary battery having the wound-type power generating element. The present invention may be applied to a laminated-type lithium ion battery in which a plurality of positive electrode members and a plurality of negative electrode members are laminated.

In the embodiment, the battery case body is entirely formed of the metal case member. Alternatively, the battery case may be partially formed of the metal case member including the inner exposed surface and the outer exposed surface.

The embodiment and the modified form exemplify that metal is exposed over all the inside of the battery case. The inside of the battery case has only to partially include the inner exposed surface and other portions may be covered by resin or the like. Furthermore, if only the inner exposed surface and the outer exposed surface are ensured as the metal case member, a laminated film made by laminating a resin film and metal foil may be used for the battery case.

The invention claimed is:

1. A lithium ion battery before pre-doping comprising:
a negative electrode member before initial charge, supporting a negative active material before initial charge;
a positive electrode member supporting a positive active material;
an electrolyte body; and
a battery case internally housing the negative electrode member before being subjected to initial charge, the positive electrode member, and the electrolyte body,
wherein the lithium ion battery before pre-doping comprises a lithium ion supply body made of a lithium compound capable of releasing lithium ions when negative voltage is applied to the negative electrode member before initial charge and positive voltage is applied to the lithium ion supply body while the negative active material before initial charge and the lithium ion supply body are respectively in contact with the electrolyte body,
the battery case includes a metal case member made of metal, the metal case member including an inner exposed surface exposed inside the battery case and an outer exposed surface exposed outside the battery case,
the lithium ion supply body is placed in contact with at least part of the inner exposed surface of the metal case member,
the negative electrode member before initial charge and the metal case member are electrically insulated from each other except via an electrical connection through the electrolyte body, and
the lithium ion supply body and the negative active material before initial charge are respectively in contact with the electrolyte body.

2. The lithium ion battery before pre-doping according to claim 1, wherein the lithium compound is a low oxidation potential lithium compound having an oxidation potential whose maximum oxidation potential obtainable when a lithium ion content is changed is lower than a corrosion potential of the metal making the metal case member.

3. A lithium ion battery manufacturing method of manufacturing a lithium ion battery before pre-doping comprising:
a negative electrode member before initial charge, supporting a negative active material before initial charge;
a positive electrode member supporting a positive active material;
an electrolyte body;
a battery case internally housing the negative electrode member before initial charge, the positive electrode member, and the electrolyte body; and
a lithium ion supply body made of a lithium compound capable of releasing lithium ions when negative voltage is applied to the negative electrode member before initial charge and positive voltage is applied to the lithium ion supply body while the negative active material before initial charge and the lithium ion supply body are respectively in contact with the electrolyte body,
wherein the battery case has a metal case member made of metal, the metal case member including an inner exposed surface exposed inside the battery case and an outer exposed surface exposed outside the battery case,
the lithium ion supply body is placed in contact with at least part of the inner exposed surface of the metal case member, the negative electrode member before initial charge and the metal case member are electrically insulated from each other except via an electrical connection through the electrolyte body, and the lithium ion supply body and the negative active material before initial charge are respectively in contact with the electrolyte body, and wherein the method comprises a lithium doping step of applying positive voltage to the outer exposed surface of the metal case member and negative voltage to the negative electrode member before initial charge to apply a predetermined voltage between the negative active material before initial charge and the lithium ion supply body and release lithium ions from the lithium compound to dope lithium into the negative active material before initial charge.

4. The lithium ion battery manufacturing method according to claim 3, wherein the lithium compound is a low oxidation potential lithium compound having an oxidation potential whose maximum oxidation potential obtainable when a lithium ion content is changed is lower than a corrosion potential of the metal making the metal case member, and the lithium doping step includes setting the predetermined voltage to be higher than the maximum oxidation potential of the low oxidation potential lithium compound and lower than the corrosion voltage of the metal.

* * * * *